US012775779B2

(12) United States Patent
Wang et al.

(10) Patent No.: US 12,775,779 B2
(45) Date of Patent: Oct. 27, 2026

(54) SUMMARY GENERATION BASED ON COMPARISON OBJECTS

(71) Applicant: International Business Machines Corporation, Armonk, NY (US)

(72) Inventors: Li Wang, Shanghai (CN); Wen Juan Nie, Ningbo (CN); Yi Chen Zhang, Shanghai (CN); Chuan Le Zheng, Shanghai (CN); Danlei Zhang, Shanghai (CN); Xiao Feng Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/123,425

(22) Filed: Mar. 20, 2023

(65) Prior Publication Data

US 2024/0320414 A1 Sep. 26, 2024

(51) Int. Cl.
*G06F 40/166* (2020.01)
*G06F 40/284* (2020.01)
(Continued)

(52) U.S. Cl.
CPC .......... *G06F 40/166* (2020.01); *G06F 40/284* (2020.01); *G06F 40/30* (2020.01); *G06N 3/08* (2013.01)

(58) Field of Classification Search
CPC ...... G06F 40/166; G06F 40/284; G06F 40/30; G06F 40/25; G06F 40/103; G06F 40/253; G06F 40/40; G06F 40/169; G06N 3/08
See application file for complete search history.

(56) References Cited

U.S. PATENT DOCUMENTS 7,752,204 B2 * 7/2010 Kao ...................... G06F 16/345 707/917
8,392,284 B2 3/2013 Musgrove et al.
(Continued)

FOREIGN PATENT DOCUMENTS

CN 111159394 A 5/2020
CN 111684820 A * 9/2020 ............... G08B 7/06
(Continued)

OTHER PUBLICATIONS

Ristoski, P., et al., "A Machine Learning Approach for Product Matching and Categorization", Semantic Web, Jan. 1, 2018 pp. 707-728, vol. 9, Issue 52.
(Continued)

*Primary Examiner* — Mohammad K Islam
(74) *Attorney, Agent, or Firm* — Scully, Scott, Murphy & Presser, P.C.; Tihon Poltavets

(57) ABSTRACT

Summary generation based on comparison objects can include receiving text descriptions of a target object and at least one comparison object. Semantic vectors from the text descriptions can be obtained, using a deep learning based semantic extraction model. The semantic vectors can be input to a generator model trained using an adversarial machine learning technique, the generator model outputting a text summary of the target object describing only unique characteristics of the target object different from characteristics of the at least one comparison object and excluding the characteristics of the at least one comparison object.

20 Claims, 10 Drawing Sheets

(51) Int. Cl.
*G06F 40/30* (2020.01)
*G06N 3/08* (2023.01)

(56) References Cited

U.S. PATENT DOCUMENTS

| | | | | | |
|---|---|---|---|---|---|
| 9,877,100 | B1 * | 1/2018 | Tyagi | G10L 15/22 | |
| 11,630,958 | B2 * | 4/2023 | Ronen | G06F 16/345 | 704/9 |
| 2008/0201632 | A1 * | 8/2008 | Hong | G06F 16/38 | 707/E17.108 |
| 2012/0310391 | A1 * | 12/2012 | Sanders | G06F 3/017 | 700/94 |
| 2014/0270200 | A1 * | 9/2014 | Usher | G10L 25/78 | 381/74 |
| 2015/0280670 | A1 * | 10/2015 | Kauffmann | G10L 21/0316 | 381/107 |
| 2017/0161259 | A1 * | 6/2017 | Zhao | G06F 40/166 | |
| 2017/0318374 | A1 * | 11/2017 | Dolenc | H04R 29/004 | |
| 2017/0345429 | A1 * | 11/2017 | Hardee | G10L 25/93 | |
| 2020/0081909 | A1 * | 3/2020 | Li | G06N 3/0455 | |
| 2020/0117287 | A1 * | 4/2020 | Yaron | G06F 3/167 | |
| 2020/0311122 | A1 * | 10/2020 | Ramamurthy | G06N 3/08 | |
| 2022/0237373 | A1 * | 7/2022 | Singh Bawa | G06N 20/00 | |
| 2022/0327586 | A1 * | 10/2022 | Malon | G06N 3/0895 | |
| 2023/0252237 | A1 * | 8/2023 | Pouran Ben Veyseh | G06F 40/35 | 704/9 |

FOREIGN PATENT DOCUMENTS

| | | | | | |
|---|---|---|---|---|---|
| EP | 2760015 | A1 * | 7/2014 | G06F 3/167 |
| EP | 3188495 | A1 * | 7/2017 | G10K 11/17821 |
| TW | 1241828 | B * | 2/2004 | G06F 3/011 |
| WO | WO-2020251902 | A1 * | 12/2020 | G06F 3/165 |

OTHER PUBLICATIONS

Moravvej, S.V., et al., "Efficient GAN-based Method for Extractive Summarization", Journal of Electrical and Computer Engineering Innovations (JECEI), Jul. 2022, Received Jul. 15, 2021, Reviewed Aug. 27, 2021, Revised Nov. 1, 2021, Accepted Nov. 8, 2021, pp. 287-298, 10(2).

Wikipedia, "Multi-document summarization", https://en.wikipedia.org/wiki/Multi-document_summarization, Last edited May 29, 2022, 4 pages.

Ma, C., et al., "Multi-document Summarization via Deep Learning Techniques: A Survey", arXiv:2011.04843v3, Dec. 9, 2021, 35 pages.

Vikas, O., et al., "Multiple Document Summarization Using Principal Component Analysis Incorporating Semantic Vector Space Model", Computational Linguistics and Chinese Language Processing, Jun. 2008, pp. 141-156, vol. 13, No. 2.

Kogilavani, A., et al., "Semantic summary generation from multiple documents using feature specific sentence ranking strategy", Computer Science and Engineering, Elixir Comp. Sci. Engg. (2011), Received Oct. 4, 2011, Received in revised form Oct. 22, 2011, Accepted Nov. 3, 2011, pp. 5372-5375, 40.

Devlin et al., "BERT: Pre-training of Deep Bidirectional Transformers for Language Understanding", arXiv, May 24, 2019, 16 pages, doi: https://doi.org/10.48550/arXiv.1810.04805.

No Author, "Convolutional neural network", Wikipedia, Mar. 15, 2025, 40 pages, doi: https://en.wikipedia.org/wiki/Convolutional_neural_network.

Reimers, et al., "Sentence-BERT: Sentence Embeddings Using Siamese BERT-Networks", arXiv, Aug. 27, 2019, 11 pages, doi: https://arxiv.org/pdf/1908.10084.pdf.

Thomas Wolf, "XLNet: Generalized Autoregressive Pretraining for Language Understanding", huggingface/xlnet, Github, Jun. 27, 2019, 10 pages, doi: https://github.com/huggingface/xlnet.

Yang et al., "XLNet: Generalized Autoregressive Pretraining for Language Understanding", arXiv, Jan. 2, 2020, 18 pages, doi: https://doi.org/10.48550/arXiv.1906.08237.

* cited by examiner

SUMMARY GENERATION BASED ON COMPARISON OBJECTS

BACKGROUND

The present application relates generally to computers and computer applications, and more particularly to automated machine learning that can generate summary based on comparison objects.

Comparative analysis reports that cover objects such as products and/or services can be useful in product developments and marketing strategies. However, generating such kinds of reports may be rather time-consuming and may require repetitive and manual work. The reasons can be multi-faceted. For example, the raw data of those objects can be large and scattered across locations, where one would need to read them through to obtain what one is searching for; the source collected from different channels can be described differently in text. Sometimes one may need to convert the descriptions and manually summarize the main points.

BRIEF SUMMARY

The summary of the disclosure is given to aid understanding of a computer system and method of summary generation based on comparison objects, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or the method of operation to achieve different effects.

A method, in an aspect, can include receiving text descriptions of a target object and at least one comparison object. The method can also include obtaining semantic vectors from the text descriptions, using a deep learning based semantic extraction model. The method can further include inputting the semantic vectors to a generator model trained using an adversarial machine learning technique, where the generator model outputs a text summary of the target object describing only unique characteristics of the target object different from characteristics of the at least one comparison object and excluding the characteristics of the at least one comparison object.

A system, in an aspect, can include at least one processor. The system can also include a memory device coupled with at least one processor. At least one processor can be configured to receive text descriptions of a target object and at least one comparison object. At least one processor can also be configured to obtain semantic vectors from the text descriptions, using a deep learning based semantic extraction model. At least one processor can also be configured to input the semantic vectors to a generator model trained using an adversarial machine learning technique, where the generator model outputs a text summary of the target object describing only unique characteristics of the target object different from characteristics of the at least one comparison object and excluding the characteristics of the at least one comparison object.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
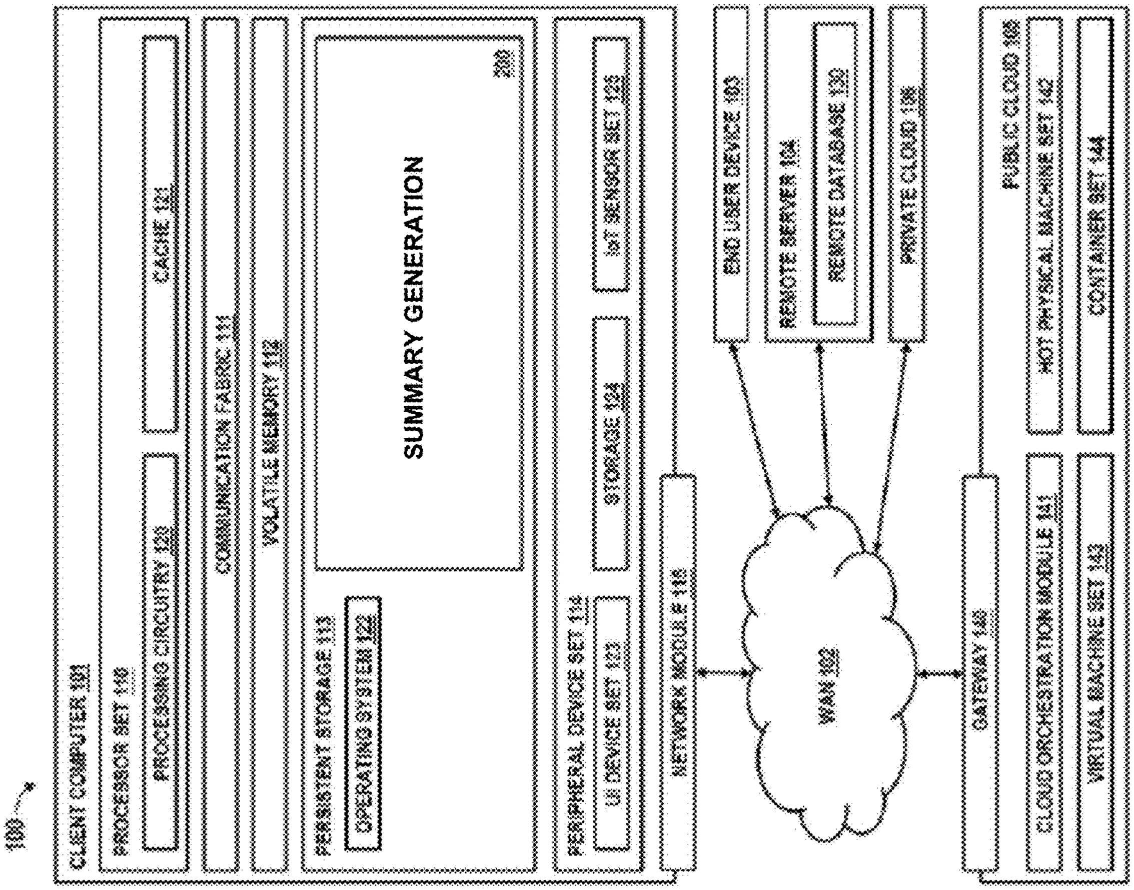
FIG. 1 shows an example of a computing environment, which can implement summary generation in an embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as summary generation code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In one or more embodiments, automated generation of summary comparing a target object and one or more comparison objects is provided. In an aspect, the summary that is generated provides only the key differentiators from other comparison objects, and the comparative analysis report generation can be more efficient, save computer processing time, assure quality of the output.

A system, method, and/or technique can generate a summary of a target object, as compared to one or more comparison objects, that only describes the unique characteristics of the target object based on the text descriptions of the target object and one or more comparison objects. The methodology described herein can be useful in performing comparative researches on objects. The methodology can automatically generate a summary from multiple documents written about the same topic. The methodology can involve multi-objects and focus on the target object and its unique characteristics. The generated summary for the target object can avoid any unnecessary conflicts by only describing the unique characteristics of the target object and excluding the descriptions of the characteristics of any related comparison objects.

A method that generates a summary of a target object, in an embodiment, can include the following implementation features. The method may obtain semantic vectors from respective text descriptions of a target object and one or more comparison objects, using a semantic extraction model based on deep learning. A deep learning summary generator takes in as input the obtained semantic vectors of the target object and comparison objects. The summary generator outputs a text summary that only describes the characteristics of the target object which are different from those of comparison objects.

Figure 2:
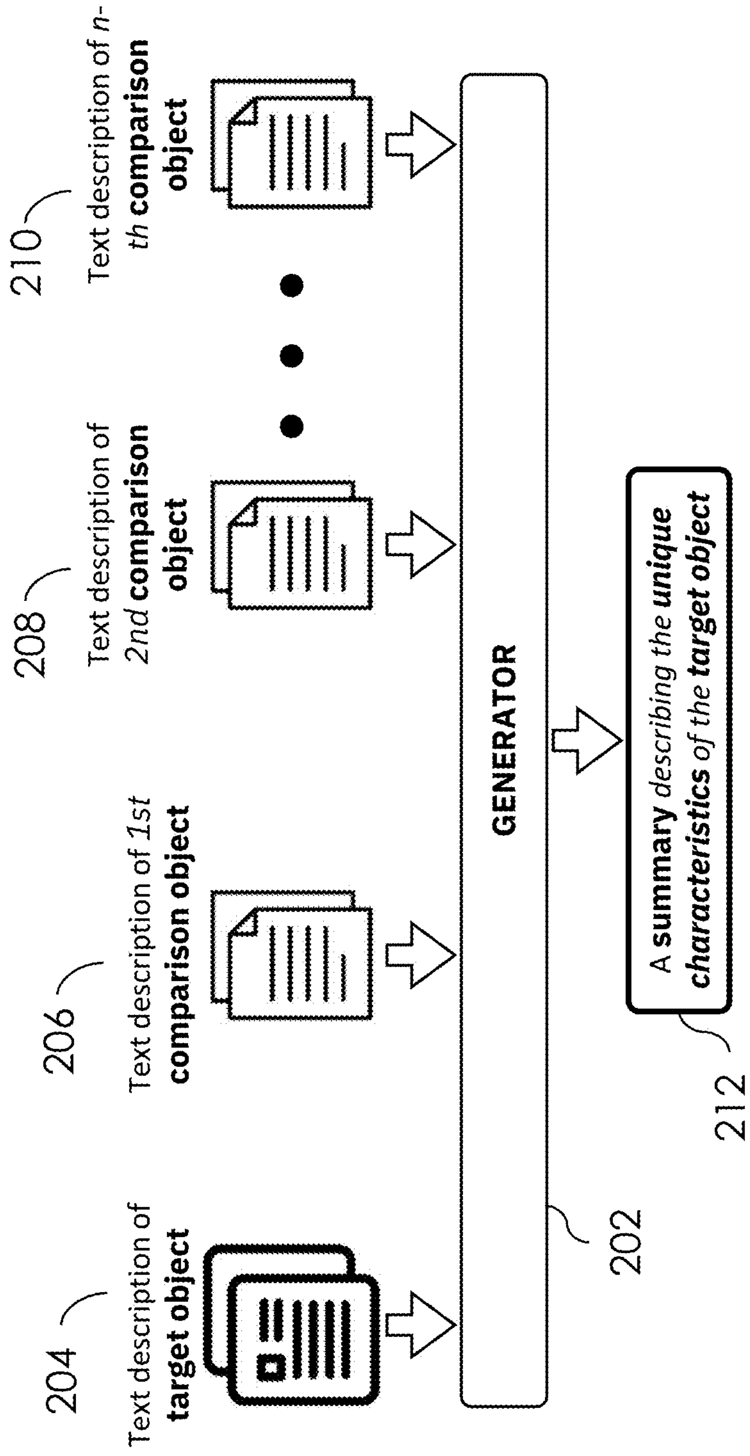
FIG. 2 is a diagram illustrating an overview of a summary generator in an embodiment.

FIG. 2 is a diagram illustrating an overview of a summary generator in an embodiment. A summary generator 202 can understand the text descriptions of both a target object 204 (e.g., a product of an enterprise) and multiple comparison objects 206, 208, 210 (e.g., enterprise's competitor products) respectively, and generate a text summary 212 for the target object. In an embodiment, such a generated summary 212 only describes the unique characteristics of the target object and excludes the descriptions of the characteristics of any involved comparison objects, especially their unique characteristics.

Figure 3:
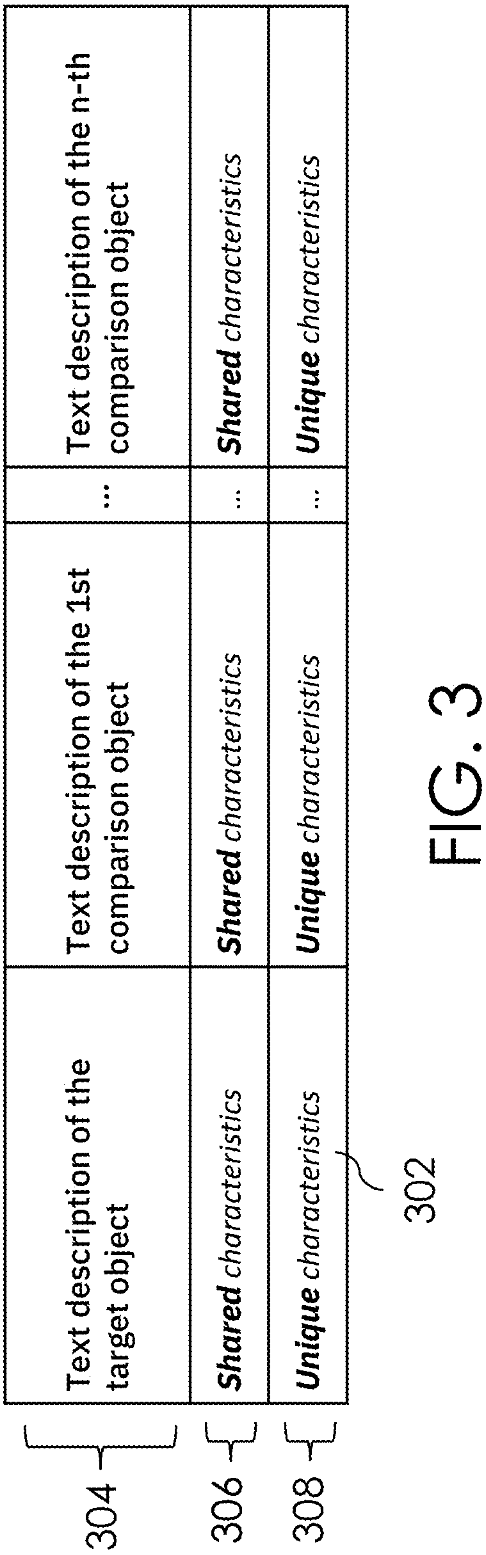
FIG. 3 shows possible contents of the text description of the objects in an embodiment.

For example, FIG. 3 shows possible contents of the text description of the objects. The description of objects 304 can include shared characteristics 306 and unique characteristics 308. Shared characteristics refer to characteristics that are shared or common among two or more objects. Unique characteristics refer to characteristics that are unique to an object, e.g., no other object has the same characteristic. In an embodiment, a summary that is generated according to an embodiment of a method and/or system disclosed herein, describes only the unique characteristics of the target object 302.

Figure 4:
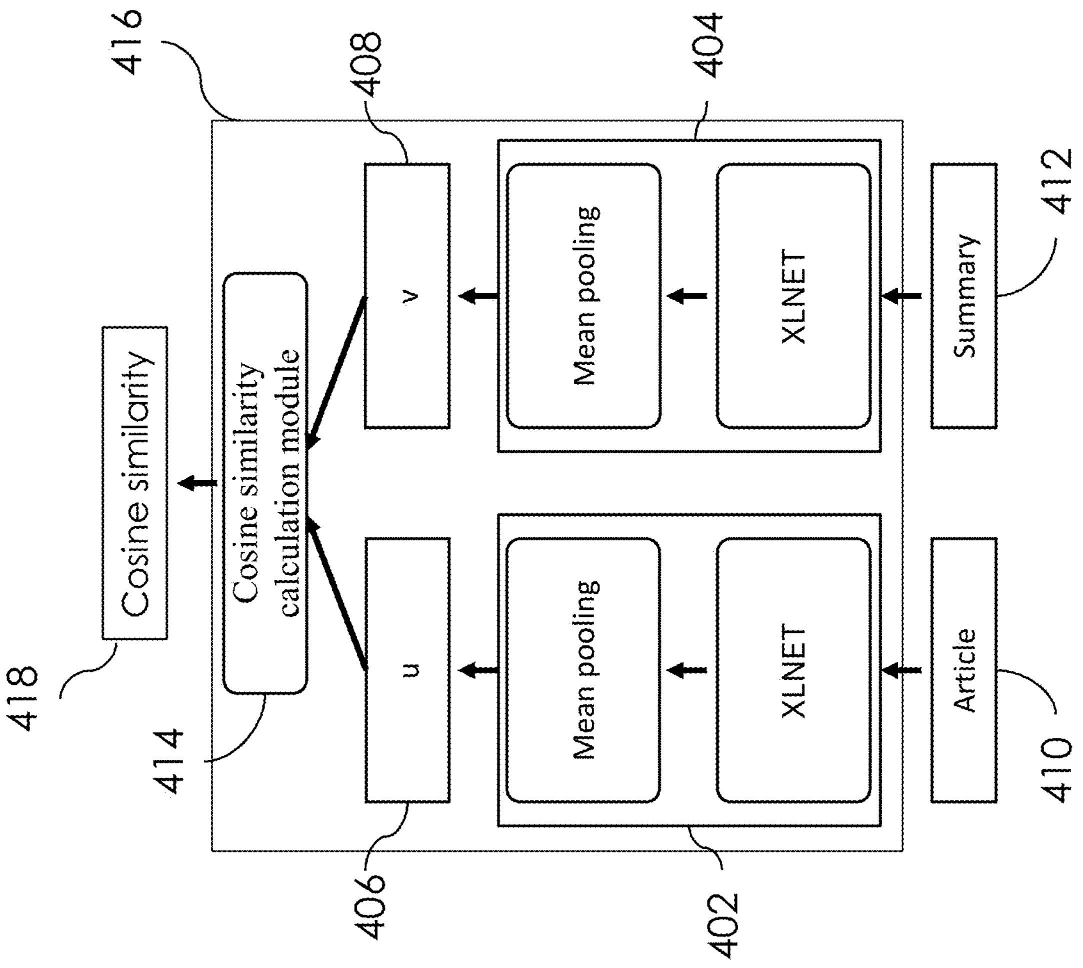
FIG. 4 shows an example semantic extraction model architecture in an embodiment.

FIG. 4 shows an example semantic extraction model architecture in an embodiment. A semantic extraction model 402, 404 can obtain a semantic vector 406, 408 for a document 410 or text paragraph 412. In an embodiment, this model can be based on the Sentence-Bidirectional Encoder Representations from Transformers (SBERT) and can be augmented as follows. A method, for example, may replace the BERT used by the SBERT with an XLNet (XLNet-Large) model in order to calculate semantic vectors for long text paragraphs or even large documents, instead of sentences. XLNet is a generalized autoregressive pretraining technique. The method may pretrain the XLNet individually at first with all documents collected and preprocessed in advance, based on the permutation language modeling objective. Three separator tokens, [BOP] (beginning of paragraph). [EOP] (end of paragraph) and [EOS] (end of sentence) can be inserted into each document as the boundaries.

With the pretrained XLNet, the method may construct a Siamese Neural Network 416 to fine-tune the XLNet. The Siamese Neural Network takes in an article 410 and a summary 412, which can all be randomly selected from a pre-built corpus (e.g., coming from publicly available data). Those three separator tokens ([BOP], [EOP] and [EOS]) are also inserted into each input article or summary as the boundaries. The method may calculate the cosine similarity 418 by a cosine similarity calculation module 414 (e.g., cosine similarity value ranges from −1 to 1) between the two semantic vectors u 406 and v 408 (the outputs of the semantic extraction model). The cosine similarity calculation module 414 can be a computer function implemented on or by hardware or software. Then, the method may calculate the mean absolute error (MAE) loss of the cosine similarity and a corresponding training label. By way of example, the label can be set to 1 if input article and summary belong to the same document; otherwise, the label can be set to −1. The method may use backpropagation to update the parameters of the XLNet.

Figure 5:
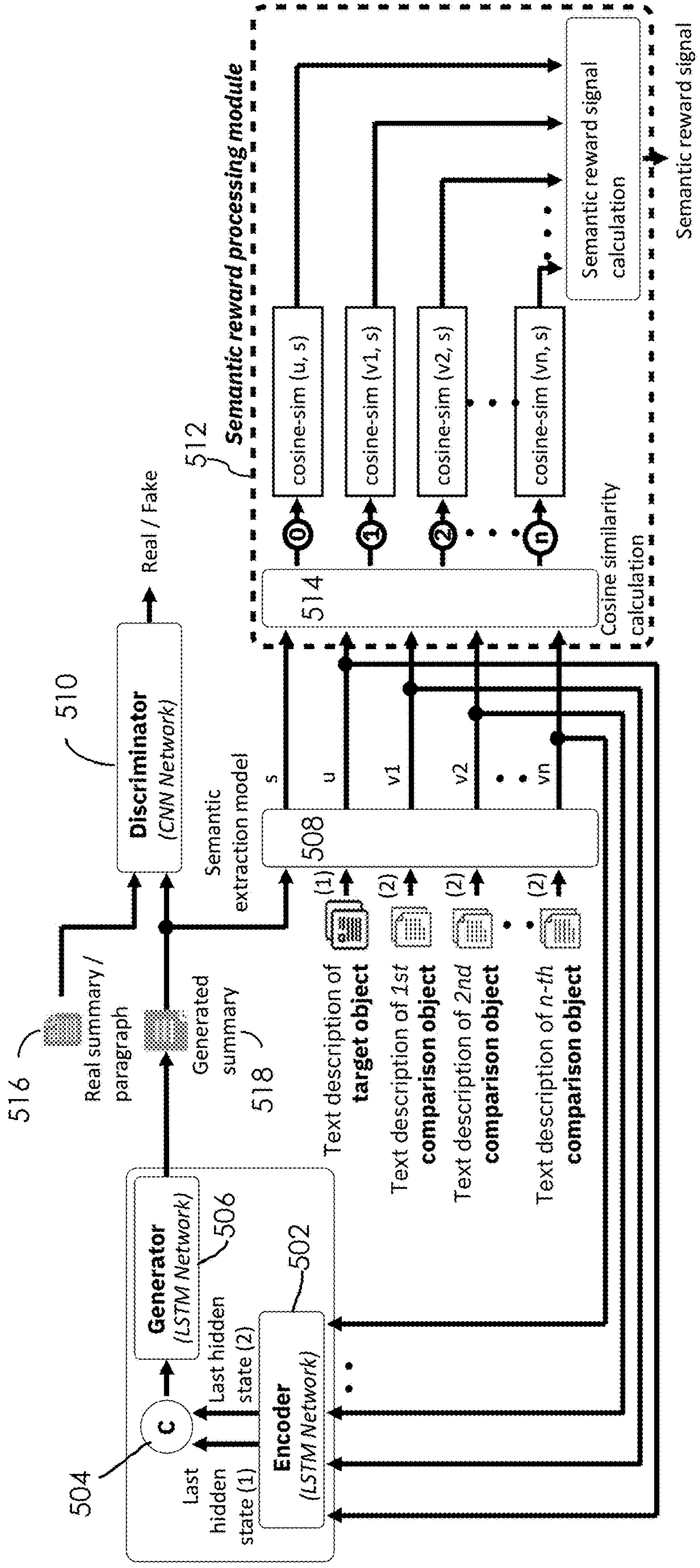
FIG. 5 shows a summary generator model architecture in an embodiment.

FIG. 5 shows a summary generator model architecture in an embodiment. The summary generator in an embodiment employs Generative Adversarial Networks. In an embodiment, the summary generator augments Generative Adversarial Networks. For example, besides a generator and a discriminator, the summary generator can also include an encoder, which can be long short-term memory (LSTM)-based, to take in analyzed semantic vectors extracted from the text descriptions of multiple comparison objects, and a module called “semantic-reward processing module” for the adversarial training of the generator by providing semantic reward signals.

In an embodiment, an encoder 502 can use long short-term memory (LSTM) networks, or another machine learning model such as, but not limited to, a recurrent neural network (RNN). Firstly, it takes in a semantic vector u which is extracted from the input text description of a target object by using the semantic extraction model 508 (e.g., also shown at 402, 404 in FIG. 4) and outputs its last hidden state as first (1st) last hidden state. Secondly, it takes in a sequence of one or more semantic vectors $v_1, v_2, \ldots, v_n$ which are extracted from the input text descriptions of multiple comparison objects in turn and outputs its last hidden state as second (2nd) last hidden state. Thirdly, 1st last hidden state and 2nd last hidden state are concatenated together, e.g., by a concatenator or concatenation calculation module 504, and fed into a generator 506. The concatenator or concatenation calculation module 504 can be a computer function implemented on hardware or software, for example, which performs a concatenation operation or instruction on input data. "Last hidden state" refers to an output of the encoder 502. For instance, for LSTM model (or RNN model or the like), the last hidden state indicates the output of the last LSTM cell or layer of cells. For instance, for each input sequence, LSTM model outputs a last hidden state only. "1st last hidden state" refers to a last hidden state from the encoder (e.g., LSTM) corresponding to a first input sequence (e.g., an input sequence containing one element, which is a target object's semantic vector). "2nd last hidden state" refers to a last hidden state from LSTM corresponding to a second input sequence (e.g., an input sequence contains multiple comparison objects' semantic vectors).

The generator 506 can use LSTM, or another machine learning model such as a recurrent neural network (RNN), and take in the concatenated result of 1st last hidden state and 2nd last hidden state from the encoder 502 as its initial hidden state. Then, the generator 506 samples existing text tokens (represented as one-hot encoding vectors) to generate a sequence of text tokens (including separator tokens [BOP], [EOP] and [EOS] as sentence/paragraph boundaries) as a new summary.

A discriminator 510 uses a convolutional neural network (CNN) with a highway structure and distinguishes between real summaries or text paragraphs (that is, sequences of one-hot encoded text tokens) from the pre-collected corpus and generated summaries from the generator 506.

A semantic-reward processing module 512 performs the following processing in an embodiment:

Extract the semantic vector s from the generated summary; Calculate the cosine similarity between each pair of semantic vectors, such as (u, s), ($v_1$, s), ($v_2$, s), . . . , ($v_n$, s) (e.g., by cosine similarity calculation module 514 that performs cosine similarity calculation or operation); Calculate semantic reward signal, which is involved in the adversarial training of the generator, based on all cosine similarities. Action-value functions, which can provide rewards based on actions and states are further described below with reference to FIG. 9.

Building a training dataset can include crawling massive available articles and paired summaries (e.g., if such summaries exist) from available sources such as (but not limited to) the Internet, together with documents describing multiple comparison objects (e.g., text descriptions of competing products from multiple companies' websites or other sources that are available) to collect data. Building the training dataset can also include preprocessing and tokenizing the collected data. In building the training dataset, for example, after preprocessing and tokenizing the collected data, separator tokens ([BOP], [EOP] and [EOS]) can be inserted into the text tokens of articles and summaries as boundaries. In an embodiment, tokens can be represented as one-hot encoding vectors later.

Figure 6:
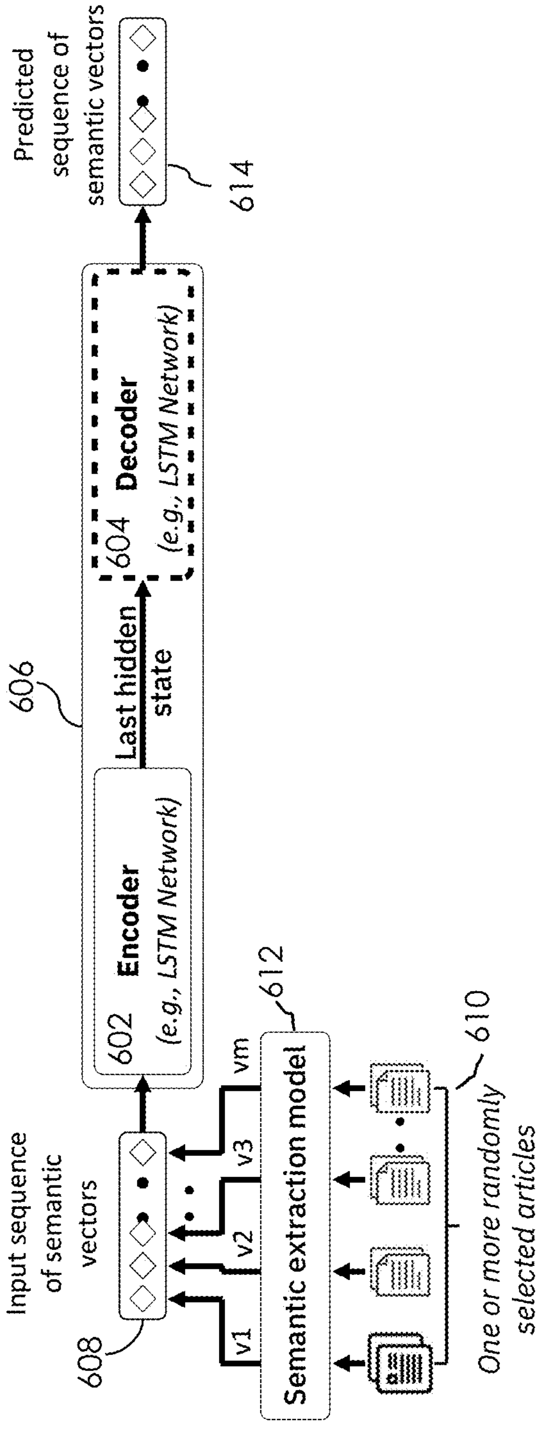
FIG. 6 is a diagram illustrating training of an encoder used with a generator in an embodiment.

In an embodiment, before the adversarial training of the summary generator, the following can be performed: train the encoder 502; pretrain the generator 506; and pretrain the discriminator 510. FIG. 6 is a diagram illustrating training of an encoder used with a generator in an embodiment. A computer processor, for example, can implement training and/or pretraining of components. For example, a processor can train an encoder 602 (also shown at 502 in FIG. 5) as follows in an embodiment. A processor can replicate the encoder 602 to obtain a decoder 604, and then combine it with the encoder 602 to compose an encoder-decoder architecture model or a model of encoder-decoder architecture 606. The processor can use left-to-right prediction (also known as auto-regressive language modeling) to train this model 606 based on every semantic-vector sequence 608, which includes the semantic vectors extracted from 1~m randomly selected articles 610 from the training dataset respectively. A semantic extraction model 612 (e.g., also described with reference to FIG. 4) can extract semantic vectors of the articles 610 one by one to obtain a semantic-vector sequence 608. By way of example, the processor can use cross entropy loss and backpropagation techniques to update the parameters of the encoder 602 and the decoder 604. The encoder 602 trains to generate a hidden state (e.g., last hidden state) from the input sequence of semantic vectors 608. The decoder 604 trains to generate a reconstructed semantic-vector sequence, i.e., outputs a predicted sequence of semantic vectors 614, based on the hidden state from the encoder 602. The hidden states that the pretrained encoder 602 outputs can be used by the generator (e.g., 506 in FIG. 5).

A processor may pretrain the generator (e.g., 506 in FIG. 5) using Maximum Likelihood Estimation (MLE) based on the text-token sequences (including separator tokens [BOP], [EOP] and [EOS]) of all summaries and text paragraphs from the training dataset, and use cross entropy loss and backpropagation to update the parameters of the generator. Another loss function can also be used. During such pretraining, the generator sets its initial hidden state to zeros, instead of taking in data from the encoder 502.

A processor may pretrain the discriminator (e.g., 510 in FIG. 5) as follows in an embodiment. For example, a processor may pretrain the discriminator via minimizing the cross entropy for its real or fake classification based on the real text-token sequences (including separator tokens [BOP], [EOP] and [EOS]) of randomly selected summaries or text paragraphs 516 from the training dataset and the generated sequences 518 from the pretrained generator. Backpropagation can also be used to update the parameters of the discriminator.

Figure 7:
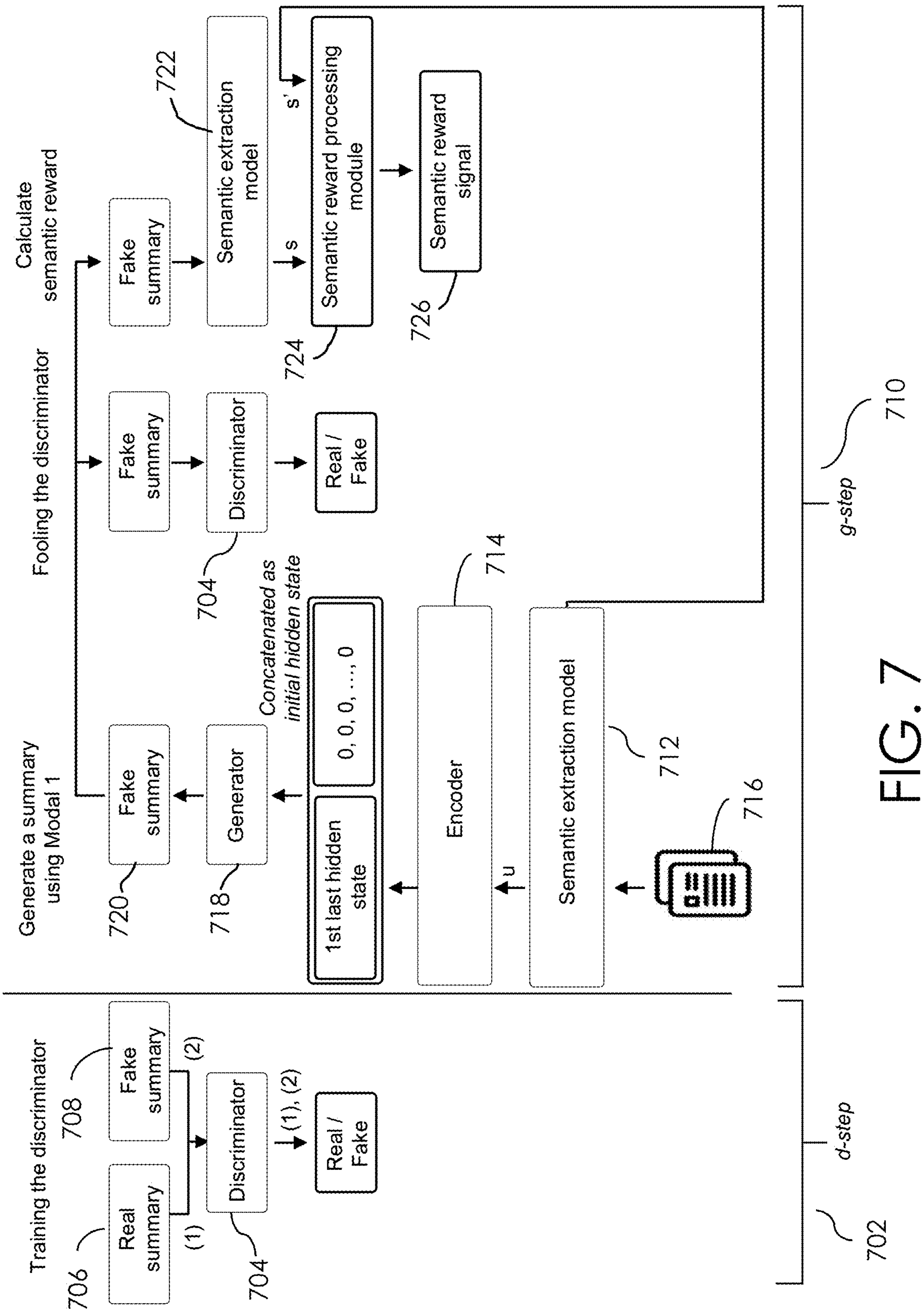
FIG. 7 is a diagram illustrating a mode of training in an embodiment.

In an embodiment, adversarial training undergoes two different modes of training, e.g., referred to as modal 1 and modal 2. FIG. 7 illustrates a mode of training in an embodiment, for example, modal 1. In d-step shown at 702, the discriminator 704 (e.g., also shown in FIG. 5 at 510) learns to distinguish between real summary 706 and fake summary 708. In g-step shown at 710, the generator 718 learns to generate a summary that imitates a real summary. The encoder 714 takes in only one semantic vector u extracted, using the semantic extraction model 712, from a random article 716 (provided by the training dataset). Then, the generator 718 concatenates the last hidden state of the encoder (as 1st last hidden state) and a zero vector (as the placeholder of 2nd last hidden state) as its initial hidden state and generates a fake summary 720 for that random article. Here, "1st last hidden state" refers to a last hidden state from the encoder (e.g., LSTM) corresponding to a first input sequence (i.e., an input sequence containing one element, which is a target object's semantic vector). The generator 718 tries to generate summaries 720 indistinguishable from real ones by the discriminator 704 (e.g., trained as shown at 702). The semantic reward processing module 724 calculates a semantic reward signal 726 based on the semantic vector s extracted from every generated summary 720 and the semantic vector s' extracted from the paired summary (provided by the training dataset) of that random article 716. For example, the semantic extraction model 712 may extract semantic vectors from the article 716 and associated summary provided with that article. The semantic extraction model 712 may also be used to extract semantic vectors from the generated summary or summaries 720 generated by the generator 718.

In each g-step at 710, the training may use a policy gradient to update the generator's parameters. In each d-step at 702, the training may use the current generator to generate fake summaries and combine with real summaries or text paragraphs (from the training dataset) to minimize the cross entropy for the discriminator 704. In an embodiment, the encoder 714 is involved in both g-steps 710 and d-steps 702 to keep encoding input semantic vectors extracted from random articles and delivering its last hidden states. The adversarial training with modal 1 can be continued until the generator converges, e.g., a threshold minimum discrepancy error is reached. Then, the adversarial training with modal 2 can start.

Figure 8:
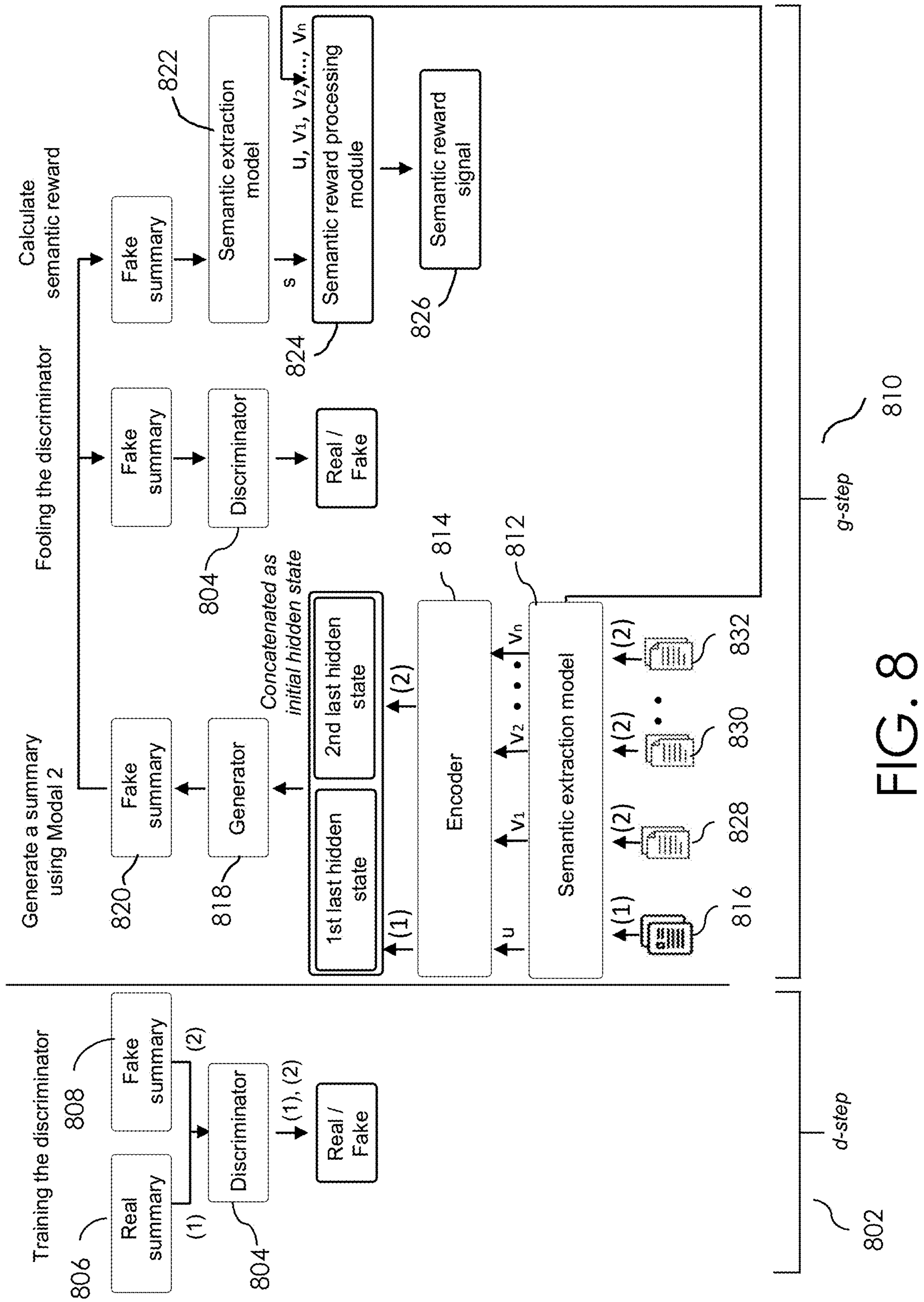
FIG. 8 illustrates another or next mode of training in an embodiment.

FIG. 8 illustrates another or next mode of adversarial training in an embodiment, for example, modal 2. In adversarial training with modal 2, the discriminator 804 (also shown in FIG. 7 at 704) learns to distinguish between real and fake summaries 806, 808 as shown in d-step at 802. In g-step shown at 810, the encoder 814 (also shown in FIG. 7 at 714) takes in a semantic vector u extracted from the text description of a random target object 816 (provided by the training dataset) and outputs its last hidden state (as 1st last hidden state). The encoder 814 also takes in a sequence of one or more semantic vectors $v_1, v_2, \ldots, v_n$ extracted from the text descriptions of corresponding comparison objects 828, 830, 832 (provided by the training dataset and the number is random) in turn and outputs its last hidden state (as 2nd last hidden state). The semantic extraction model 812 (also shown at 712 in FIG. 7) extracts or outputs semantic vectors given text descriptions as inputs. Then, the generator 818 (also shown at 718 in FIG. 7) concatenates both 1st last hidden state and 2nd last hidden state from the encoder 814 as its initial hidden state and generates a fake summary 820 for the random target object 816. The generator 818 tries to generate summaries indistinguishable from real ones by the discriminator 804. The semantic reward processing module 824 (also shown at 724 in FIG. 7) calculates a semantic reward signal 826 based on the semantic vector s extracted from every generated summary 820 and those related semantic vectors u, $v_1, v_2, \ldots, v_n$ taken by the encoder 814.

In each g-step at 810, the training can use the policy gradient to update the generator's parameters. In each d-step at 802, the training can use the current generator to generate fake summaries and combine with real summaries or text paragraphs (from the training dataset) to minimize the cross entropy for the discriminator 804. The encoder 814 can be involved in both g-steps 810 and d-steps 802 to keep delivering 1st last hidden state and 2nd last hidden state every time. The adversarial training with modal 2 can be continued until the generator converges, for example, some minimum threshold error or discrepancy has been reached.

Figure 9:
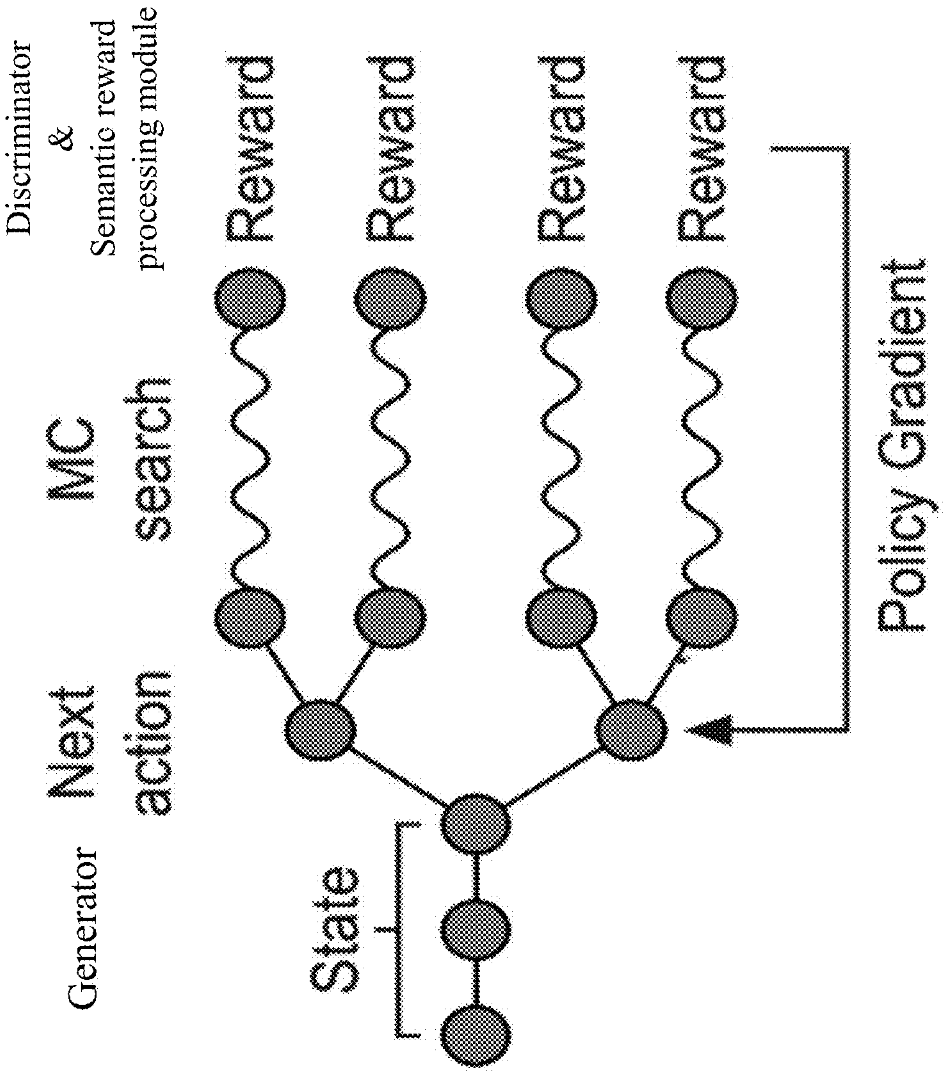
FIG. 9 illustrates a policy gradient in an embodiment.

The following illustrates an action value function in an embodiment. FIG. 9 illustrates a policy gradient in an embodiment. During the adversarial training, the generator is trained by policy gradient where the final reward signal is provided by the discriminator and the semantic reward processing module, and is passed back to the intermediate action value via Monte Carlo search. Below is the action-value function(s) of a text-token sequence used in an embodiment. Briefly, in machine learning such as reinforcement learning, action-value function returns a value or reward for using certain action in a certain state following a policy. Action-value function is also called the Q function. It specifies how good it is for an agent to perform a particular action in a state with a policy.

For modal 1:

$$Q^{G_\theta}(\mathbb{s} = Y_{1:t-1}, a = y_t) = \begin{cases} \frac{1}{N}\sum_{n=1}^{N}(\lambda_1 * D_\phi(Y_{1:T}^n) + \lambda_2 * & \text{for } t < T \\ \sigma(\text{cosine}(\mathbb{E}(Y_{1:T}^n), s'))), \; Y_{1:T}^n \in MC^{G_\beta}(Y_{1:t}; N) & \\ \lambda_1 * D_\phi(Y_{1:t}) + \lambda_2 * \sigma(\text{cosine}(\mathbb{E}(Y_{1:t}), s')) & \text{for } t = T \end{cases}$$

For modal 2:

$$Q^{G_\theta}(\mathbb{s} = Y_{1:t-1}, a = y_t) = \begin{cases} \frac{1}{N}\sum_{n=1}^{N}\Big(\lambda_1 * D_\phi(Y_{1:T}^n) + \lambda_2 * \sigma\Big(\text{cosine}(\mathbb{E}(Y_{1:T}^n), u) - \sum_{i=1}^{m}(\text{cosine}((\mathbb{E}(Y_{1:T}^n), v_i)))/m\Big)\Big) \\ Y_{1:T}^n \in MC^{G_\beta}(Y_{1:t}; N) \quad \text{for } t < T \\ \lambda_1 * D_\phi(Y_{1:t}) + \lambda_2 * \sigma\Big(\text{cosine}(\mathbb{E}(Y_{1:t}), u) - \sum_{i=1}^{m}(\text{cosine}((\mathbb{E}(Y_{1:T}), v_i)))/m\Big) \\ \quad \text{for } t = T \end{cases},$$

Where:

$$D_{\phi}(Y^{n}_{1:T})$$

is the estimated probability of being real by the discriminator as the reward.

$$\sigma(\text{cosine}(\mathbb{E}(Y^{n}_{1:T}), s'))$$

is the calculated semantic reward signal by the semantic reward processing module during the adversarial training with modal 1.

$$\sigma\left(\text{cosine}(\mathbb{E}(Y^{n}_{1:T}), u) - \sum_{i=1}^{m}(\text{cosine}((\mathbb{E}(Y^{n}_{1:T}), v_i)))/m\right)$$

is the calculated semantic reward signal during the adversarial training with modal 2.

$\sigma(\cdot)$ indicates ReLU activation function; cosine(•) is to calculate cosine similarity; $\mathbb{E}(\cdot)$ is to extract a semantic vector from a generated summary; s' is a semantic vector extracted from the paired summary of a random article; u is a semantic vector extracted from the text description of a target object; $v_i$ is a semantic vector extracted from the text description of a corresponding comparison object; T indicates a preset maximum length of generated summaries.

$\lambda_1$ and $\lambda_2$ are the hyper-parameters that control the relative importance of factors respectively, and $\lambda_1+\lambda_2=1$. One embodiment uses $\lambda_1=0.4$ and $\lambda_2=0.6$.

Figure 10:
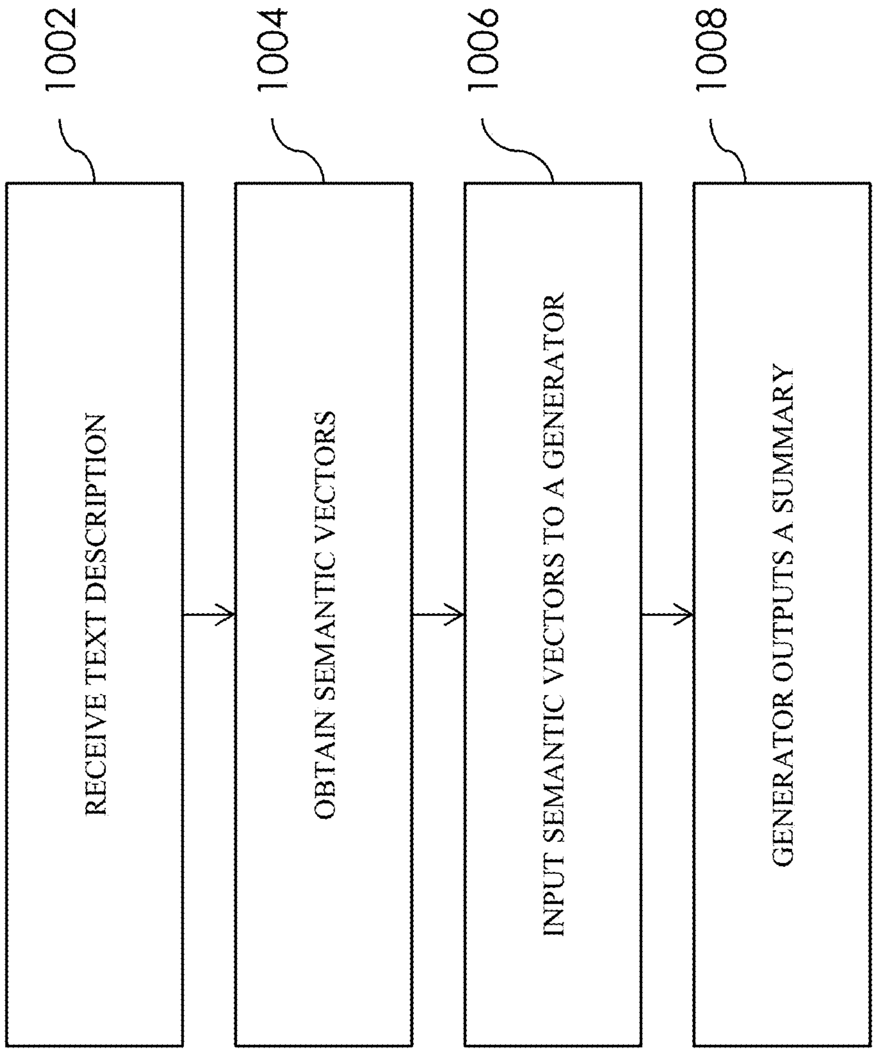
FIG. 10 is a flow diagram illustrating a method in an embodiment.

FIG. 10 is a flow diagram illustrating a method in an embodiment. The method can be performed or implemented by one or more computer processors. Examples of computer processors that can implement the method can include those described with reference to FIG. 1. At 1002, the method can include receiving text descriptions of a target object and at least one comparison object.

At 1004, the method can include obtaining semantic vectors from the text descriptions, using a deep learning based semantic extraction model.

At 1006, the method can include inputting the semantic vectors to a generator model trained using adversarial training technique. At 1008, the generator model outputs a text summary of the target object describing only unique characteristics of the target object different from the at least one comparison object and excluding characteristics of the at least one comparison object.

In an embodiment, the method can also include training the deep learning based semantic extraction model. For example, the semantic extraction model can be pretrained using training documents, by a generalized autoregressive pretraining technique, and refined by constructing a Siamese neural network that takes an article and summary, and computes or uses as a loss function, mean absolute error (MAE) loss of cosine similarity of vectors associated with the article and the summary, and a corresponding training label.

In an aspect, the generator model is trained based on generative adversarial networks. Training of the generator model can include training an encoder, using encoder-decoder architecture, to encode the semantic vectors into hidden states, the generator model using the hidden states output by the encoder, as its initial hidden states.

Training of the generator model can also include pretraining the generator model using Maximum Likelihood Estimation (MLE) based on text-token sequences of summaries and text paragraphs from a training dataset, and using cross entropy loss and backpropagation techniques to update the generator model's parameters, where during the pretraining of the generator model, the generator model's initial hidden state is set to zeros. Training of the generator model can further include pretraining a discriminator via minimizing cross entropy for real versus generated classification based on real text-token sequences of randomly selected text from a training dataset and generated sequences from the pretrained generator model.

Training of the generator model can further include training the generator model in at least two modes. During first mode of training, the generator model uses as initial hidden state, a hidden state generated by the encoder based on a semantic vector extracted from a random article in a training dataset, concatenated with a zero vector, the generator model learning to generate a summary for the random article, at least in part based on a semantic reward signal computed based on a semantic vector extracted from the generated summary and a semantic vector extracted from a real summary associated with the random article. During second mode of training, the generator model uses as initial hidden state, a hidden state generated by the encoder based on a semantic vector extracted from a random target object in the training dataset, concatenated with a hidden state generated by the encoder based on a sequence of semantic vectors extracted from a set of comparison objects in the training dataset, the generator model learning to generate a summary for the random target object, at least in part based on a semantic reward signal computed based on a semantic vector extracted from the generated summary for the random target object and the sequence of semantic vectors extracted from the random target object and the set of comparison objects taken by the encoder.

The terminology used herein is for the purpose of describing particular embodiments only and is not intended to be limiting of the invention. As used herein, the singular forms "a". "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:

receiving text descriptions of a target object and at least one comparison object;

obtaining semantic vectors from the text descriptions, using a deep learning based semantic extraction model; and inputting the semantic vectors to a generator model trained using an adversarial machine learning technique, wherein the generator model uses as initial hidden state, a hidden state generated by an encoder based on a semantic vector extracted from a random target object in a training dataset, concatenated with a hidden state generated by the encoder based on a sequence of semantic vectors extracted from a set of comparison objects in the training dataset, the generator model learning to generate a summary for the random target object, at least in part based on a semantic reward signal computed based on a semantic vector extracted from the generated summary for the random target object and the sequence of semantic vectors extracted from the random target object and the set of comparison objects taken by the encoder, the generator model outputting a text summary of the target object describing only unique characteristics of the target object different from characteristics of the at least one comparison object and excluding the characteristics of the at least one comparison object.

2. The method of claim 1, further including training the deep learning-based semantic extraction model to output the semantic vectors, wherein the deep learning-based semantic extraction model is pretrained using existing training documents by using a generalized autoregressive pretraining technique, and refined by constructing a Siamese neural network that takes in an article and a summary, and computes as loss function, mean absolute error (MAE) loss of cosine similarity of vectors associated with the article and the summary, and a corresponding training label.

3. The method of claim 1, wherein the generator model is trained based on generative adversarial networks.

4. The method of claim 3, wherein training of the generator model includes training the encoder, using encoder-decoder architecture, to encode the semantic vectors into hidden states, the generator model using the hidden states output by the encoder, as its initial hidden states.

5. The method of claim 4, wherein training of the generator model further includes pretraining the generator model using Maximum Likelihood Estimation (MLE) based on text-token sequences of summaries and text paragraphs from the training dataset, and using cross entropy loss and backpropagation techniques to update the generator model's parameters, wherein during the pretraining of the generator model, the generator model's initial hidden state is set to zeros.

6. The method of claim 5, wherein training of the generator model further includes pretraining a discriminator via minimizing cross entropy for real versus generated classification based on real text-token sequences of randomly selected text from the training dataset and generated sequences from the pretrained generator model.

7. The method of claim 6, wherein training of the generator model further includes training the generator model in at least two modes, wherein during first mode of training, the generator model uses as the initial hidden state, a hidden state generated by the encoder based on a semantic vector extracted from a random article in the training dataset, concatenated with a zero vector, the generator model learning to generate a summary for the random article, at least in part based on a semantic reward signal computed based on a semantic vector extracted from the generated summary and a semantic vector extracted from a real summary associated with the random article.

8. A computer program product comprising a computer readable storage medium having program instructions embodied therewith, the program instructions readable by a device to cause the device to:

receive text descriptions of a target object and at least one comparison object;

obtain semantic vectors from the text descriptions, using a deep learning based semantic extraction model; and input the semantic vectors to a generator model trained using an adversarial machine learning technique, wherein the generator model uses as initial hidden state, a hidden state generated by an encoder based on a semantic vector extracted from a random target object in a training dataset, concatenated with a hidden state generated by the encoder based on a sequence of semantic vectors extracted from a set of comparison objects in the training dataset, the generator model learning to generate a summary for the random target object, at least in part based on a semantic reward signal computed based on a semantic vector extracted from the generated summary for the random target object and the sequence of semantic vectors extracted from the random target object and the set of comparison objects taken by the encoder, the generator model outputting a text summary of the target object describing only unique characteristics of the target object different from characteristics of the at least one comparison object and excluding the characteristics of the at least one comparison object.

9. The computer program product of claim 8, wherein the device is further caused to train the deep learning-based semantic extraction model to output the semantic vectors, wherein the deep learning-based semantic extraction model is pretrained using existing training documents by using a generalized autoregressive pretraining technique, and refined by constructing a Siamese neural network that takes in an article and a summary, and computes as loss function, mean absolute error (MAE) loss of cosine similarity of vectors associated with the article and the summary, and a corresponding training label.

10. The computer program product of claim 8, wherein the generator model is trained based on generative adversarial networks.

11. The computer program product of claim 10, wherein training of the generator model includes training the encoder, using encoder-decoder architecture, to encode the semantic vectors into hidden states, the generator model using the hidden states output by the encoder, as its initial hidden states.

12. The computer program product of claim 11, wherein training of the generator model further includes pretraining the generator model using Maximum Likelihood Estimation (MLE) based on text-token sequences of summaries and text paragraphs from the training dataset, and using cross entropy loss and backpropagation techniques to update the generator model's parameters, wherein during the pretraining of the generator model, the generator model's initial hidden state is set to zeros.

13. The computer program product of claim 12, wherein training of the generator model further includes pretraining a discriminator via minimizing cross entropy for real versus generated classification based on real text-token sequences of randomly selected text from the training dataset and generated sequences from the pretrained generator model.

14. The computer program product of claim 13, wherein training of the generator model further includes training the generator model in at least two modes, wherein during first mode of training, the generator model uses as the initial hidden state, a hidden state generated by the encoder based on a semantic vector extracted from a random article in the training dataset, concatenated with a zero vector, the generator model learning to generate a summary for the random article, at least in part based on a semantic reward signal computed based on a semantic vector extracted from the generated summary and a semantic vector extracted from a real summary associated with the random article.

15. A system comprising:

at least one processor;

a memory device coupled with the at least one processor;

the at least one processor configured to at least:

receive text descriptions of a target object and at least one comparison object;

obtain semantic vectors from the text descriptions, using a deep learning based semantic extraction model; and input the semantic vectors to a generator model trained using an adversarial machine learning technique, wherein the generator model uses as initial hidden state, a hidden state generated by an encoder based on a semantic vector extracted from a random target object in a training dataset, concatenated with a hidden state generated by the encoder based on a sequence of semantic vectors extracted from a set of comparison objects in the training dataset, the generator model learning to generate a summary for the random target object, at least in part based on a semantic reward signal computed based on a semantic vector extracted from the generated summary for the random target object and the sequence of semantic vectors extracted from the random target object and the set of comparison objects taken by the encoder, the generator model outputting a text summary of the target object describing only unique characteristics of the target object different from characteristics of the at least one comparison object and excluding the characteristics of the at least one comparison object.

16. The system of claim 15, wherein the at least one processor is further configured to train the deep learning-based semantic extraction model to output the semantic vectors, wherein the deep learning-based semantic extraction model is pretrained using existing training documents by using a generalized autoregressive pretraining technique, and refined by constructing a Siamese neural network that takes in an article and a summary, and computes as loss function, mean absolute error (MAE) loss of cosine similarity of vectors associated with the article and the summary, and a corresponding training label.

17. The system of claim 16, wherein the generator model is trained based on generative adversarial networks.

18. The system of claim 17, wherein the at least one processor is further caused to train the encoder, using encoder-decoder architecture, to encode the semantic vectors into hidden states, the generator model using the hidden states output by the encoder, as its initial hidden states.

19. The system of claim 18, wherein the at least one processor is further caused to pretrain the generator model using Maximum Likelihood Estimation (MLE) based on text-token sequences of summaries and text paragraphs from the training dataset, and using cross entropy loss and backpropagation techniques to update the generator model's parameters, wherein during pretraining of the generator model, the generator model's initial hidden state is set to zeros.

20. The system of claim 19, wherein the at least one processor is caused to train the generator model in at least two modes, wherein during first mode of training, the generator model uses as the initial hidden state, a hidden state generated by the encoder based on a semantic vector extracted from a random article in the training dataset, concatenated with a zero vector, the generator model learning to generate a summary for the random article, at least in part based on a semantic reward signal computed based on a semantic vector extracted from the generated summary and a semantic vector extracted from a real summary associated with the random article.

* * * * *